(12) United States Patent
Erickson et al.

(10) Patent No.: US 8,676,756 B2
(45) Date of Patent: Mar. 18, 2014

(54) REPLICATING TIME-SERIES DATA VALUES FOR RETRIEVED SUPERVISORY CONTROL AND MANUFACTURING PARAMETER VALUES IN A MULTI-TIERED HISTORIAN SERVER ENVIRONMENT

(75) Inventors: Brian Erickson, Long Beach, CA (US); Abhijit Manushree, Aliso Viejo, CA (US); Yevgeny Naryzhny, Foothill Ranch, CA (US); Vinay Kamath, Rancho Santa Margarita, CA (US); Clement Lie, Mission Viejo, CA (US); Elliot Middleton, Tyler, TX (US)

(73) Assignee: Invensys Systems, Inc., Foxboro, MA (US)

( * ) Notice: Subject to any disclaimer, the term of this patent is extended or adjusted under 35 U.S.C. 154(b) by 319 days.

(21) Appl. No.: 12/781,535

(22) Filed: May 17, 2010

(65) Prior Publication Data
US 2011/0282836 A1 Nov. 17, 2011

(51) Int. Cl.
*G06F 7/00* (2006.01)
*G06F 17/00* (2006.01)

(52) U.S. Cl.
USPC ............ 707/624; 707/609; 707/633; 707/694

(58) Field of Classification Search
USPC ................... 707/624, 633, 609, 694
See application file for complete search history.

(56) References Cited

U.S. PATENT DOCUMENTS

| | | | | |
|---|---|---|---|---|
| 6,421,571 | B1 * | 7/2002 | Spriggs et al. | 700/17 |
| 7,542,963 | B2 * | 6/2009 | Primm | 1/1 |
| 7,613,747 | B1 | 11/2009 | Thakur et al. | |
| 7,849,227 | B2 * | 12/2010 | Kashiyama et al. | 710/1 |
| 2008/0281825 | A1 | 11/2008 | Meng | |
| 2009/0164530 | A1 | 6/2009 | Gilpin et al. | |

OTHER PUBLICATIONS

PCT International Search Report and Written Opinion for PCT/US2011/036625 dated Dec. 26, 2011, 8 pages.

\* cited by examiner

*Primary Examiner* — Paul Kim
(74) *Attorney, Agent, or Firm* — Edward S. Jarmolowicz, Esq.

(57) ABSTRACT

A multi-tiered replicated process database and corresponding method are disclosed for supporting replication between tiers. The multi-tiered replicated process database comprises a tier one (T1) database server computer including a process history database and a replication service. The replication service includes a set of accumulators. Each accumulator is adapted to render a summary T2 database tag data structure from a set of data values retrieved from the process history database for a specified T1 database tag. The replicated database system also includes a tier two (T2) database server computer comprising a consolidated database that includes process data replicated from a set of T1 database servers. At least a portion of the process data replicated from the set of T1 database servers is summary T2 database tag data rendered by the set of accumulators.

17 Claims, 7 Drawing Sheets

| Field | Ref |
|---|---|
| DateTime | 400 |
| TagName | 402 |
| Value | 404 |
| Quality | 406 |
| QualityDetail | 408 |
| OPCQuality | 410 |
| wwTagKey | 412 |
| wwRowCount | 414 |
| wwResolution | 416 |
| wwRetrievalMode | 420 |
| wwTimeDeadband | 422 |
| wwValueDeadband | 424 |
| wwTimeZone | 426 |
| wwVersion | 428 |
| wwCycleCount | 430 |
| wwTimeStampRule | 432 |
| wwInterpolationType | 434 |
| wwQualityRule | 436 |

FIG. 4

| | |
|---|---|
| StartDateTime | 500 |
| MinimumValue | 502 |
| MaximumValue | 504 |
| FirstValue | 506 |
| LastValue | 508 |
| PointCount | 510 |
| Integral | 512 |
| IntegralOfSquares | 514 |

FIG. 5

| | |
|---|---|
| StartDateTime | 600 |
| MinimumContained | 602 |
| MaximumContained | 604 |
| TotalContained | 606 |
| PartialStart | 608 |
| PartialEnd | 610 |
| NumberStateOccurrances | 612 |
| NumericState | 614 |
| StringState | 616 |

FIG. 6

REPLICATING TIME-SERIES DATA VALUES FOR RETRIEVED SUPERVISORY CONTROL AND MANUFACTURING PARAMETER VALUES IN A MULTI-TIERED HISTORIAN SERVER ENVIRONMENT

TECHNICAL FIELD

The present invention generally relates to computing and networked data storage systems, and, more particularly, to computer automated techniques for managing (e.g., configuring and carrying out, etc.) replication of streams of supervisory control, manufacturing, and production information. Such information is typically rendered and stored in the context of supervising automated production processes and/or equipment. The data is initially stored in a local database and potentially accessed by a variety of clients such as, for example, trending applications.

Another type of client is potentially a replication client in a multi-level tiered process database environment where a set of lower level databases accumulate and supply data to a next tier database.

BACKGROUND

Industry increasingly depends upon highly automated data acquisition and control systems to ensure that industrial processes are run efficiently and reliably while lowering their overall production costs. Data acquisition begins when a number of sensors measure aspects of an industrial process and report their measurements back to a data collection and control system. Such measurements come in a wide variety of forms. By way of example the measurements produced by a sensor/recorder include: a temperature, a pressure, a pH, a mass/volume flow of material, a counter of items passing through a particular machine/process, a tallied inventory of packages waiting in a shipping line, cycle completions, etc. Often sophisticated process management and control software examines the incoming data associated with an industrial process, produces status reports and operation summaries, and, in many cases, responds to events/operator instructions by sending commands to actuators/controllers that modify operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial action such as move equipment into and out of service as required.

A very simple and familiar example of a data acquisition and control system is a thermostat-controlled home heating/air conditioning system. A thermometer measures a current temperature, the measurement is compared with a desired temperature range, and, if necessary, commands are sent to a furnace or cooling unit to achieve a desired temperature. Furthermore, a user can program/manually set the controller to have particular setpoint temperatures at certain time intervals of the day.

Typical industrial processes are substantially more complex than the above-described simple thermostat example. In fact, it is not unheard of to have thousands or even tens of thousands of sensors and control elements (e.g., valve actuators) monitoring/controlling all aspects of a multi-stage process within an industrial plant or monitoring units of output produced by a manufacturing operation. The amount of data sent for each measurement and the frequency of the measurements varies from sensor to sensor in a system. For accuracy and to facilitate quick notice/response of plant events/upset conditions, some of these sensors update/transmit their measurements several times every second. When multiplied by thousands of sensors/control elements, the volume of data generated by a plant's supervisory process control and plant information system can be very large.

Specialized process control and manufacturing/production information data storage facilities (also referred to as plant historians) have been developed to handle the potentially massive amounts time-series of process/production information generated by the aforementioned systems. An example of such system is the WONDERWARE HISTORIAN. A data acquisition service associated with the historian collects time-series data values for observed parameters from a variety of data sources (e.g., data access servers). The collected time-series data is thereafter deposited with the historian to achieve data access efficiency and querying benefits/capabilities of the historian's database. Through its database, the historian integrates plant data with event, summary, production and configuration information.

Information is retrieved from the tables of historians and displayed by a variety of historian database client applications including trending and analysis applications at a supervisory level of an industrial process control system/enterprise. Such applications include graphical displays for presenting/recreating the state of an industrial process or plant equipment at any particular point (or series of points) in time. A specific example of such client application is the WONDERWARE HISTORIAN CLIENT trending and analysis application. This trending and analysis application provides a flexible set of graphical display and analytical tools for accessing, visualizing and analyzing plant performance/status information provided in the form of streams of time-series data values for observed parameters.

Traditionally, plant databases, referred to as historians, have collected and stored in an organized manner (i.e., "tabled"), to facilitate efficient retrieval by a database server, streams of timestamped time-series data values for observed parameters representing process/plant/production status over the course of time. The status data is of value for purposes of maintaining a record of plant performance and presenting/recreating the state of a process or plant equipment at a particular point in time. Over the course of time, even in relatively simple systems, Terabytes of the streaming timestamped information are generated by the system and tabled by the historian.

In many instances, enterprises or the processes (e.g., a pipeline) within an enterprise are spread over vast geographic regions. For example, a company may operate multiple refineries or bottling plants at a number of distant geographic locations. It is generally desirable, in such systems, to place at least one historian (process database) at each geographic location. The information from the geographically distinct locations is provided to a parent historian operating at a hierarchical level (e.g., tier two) above the various geographically distinct (e.g., tier one) data historians. See, e.g., FIG. 1 (described herein below). Each of the "tier one" historians (100, 102, and 104) accumulates local information associated with a localized plant. A centralized "tier two" historian 110 receives and accumulates sets of historical data acquired and passed on by each of the "tier one" historians (100, 102, and 104). Though only a few historians are shown in FIG. 1, it will be understood by those skilled in the art that potentially dozens or even hundreds of historians can be provided at level one of a multi-tiered historian configuration.

As the size of enterprises increases, the amount of information generated and communicated over a network and stored in the historians of such enterprises increases. In very large enterprises, the total amount of data generated (communicated) by a set of independently operating process data "tier one" historians can overwhelm a centralized "tier two" recipient of such data. Moreover, the transmission of replicated data from the tier one historians to the centralized recipient can overwhelm the network used to communicate the replicated data.

SUMMARY OF THE INVENTION

A number of features are introduced for use in previous historian database procedures/methods to address the data volume and network communications costs associated with maintaining a centralized upper tier historian containing process data originating from a set of tier one (lower level) historian databases. The features include:

(1) Supporting a disconnected replication state between a lower tier historian and the centralized upper tier historian. The disconnected upper-lower tier historian support includes:
  (a) disconnected replication configuration, and
  (b) disconnected data generation. Both configuration and data generation are performed autonomously at the lower tier historian.

(2) Supporting, using a synchronization queue, re-synchronization of timestamped out-of-order data received by the T1 historian. Re-synchronization of replicated data is potentially needed in the following circumstances:
  (a) "Late data" is received by the T1 historian outside a timeframe specified for "real-time" data (e.g., 30 seconds). Late data is often associated with data provided by a remote telemetry unit (RTU) providing information to a T1 historian.
  (b) A previously disconnected data stream source has a connection restored to a T1 historian. Upon re-establishing the connection, in an exemplary embodiment the source of streamed data provides real-time data interspersed with data previously placed by the source in a store-forward memory when the connection was lost. The store-forward data is processed via the synchronization queue.
  (c) Manual Changes to data previously stored in the T1 historian. Such changes may be entered in the T1 historian several hours or even days after original (potentially real-time) data is received and replicated by the T1 historian to a T2 historian.

When out-of-order data is received by the historian, a re-synchronization event is placed on the re-synchronization queue. The event is later removed and processed to provide a replicated T2 tag value to an appropriate T2 historian.

(3) Supporting State Summaries for data initially stored in non-summary form at the lower tier historian, the state summaries thereafter being transmitted by the lower tier historian to the centralized upper tier historian.

(4) Supporting Analog Summaries for data initially stored in non-summary form at the lower tier historian, the analog summaries thereafter being transmitted by the lower tier historian to the centralized upper tier historian.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4 is a listing of fields of a summary replication tag record in accordance with an exemplary embodiment;

FIG. 5 is a listing of fields of a value field structure within an analog summary replication tag record in accordance with an exemplary embodiment;

FIG. 6 is a listing of fields of a value field structure within a time in state summary replication tag record in accordance with an exemplary embodiment;

DETAILED DESCRIPTION OF THE DRAWINGS

Figure 1:
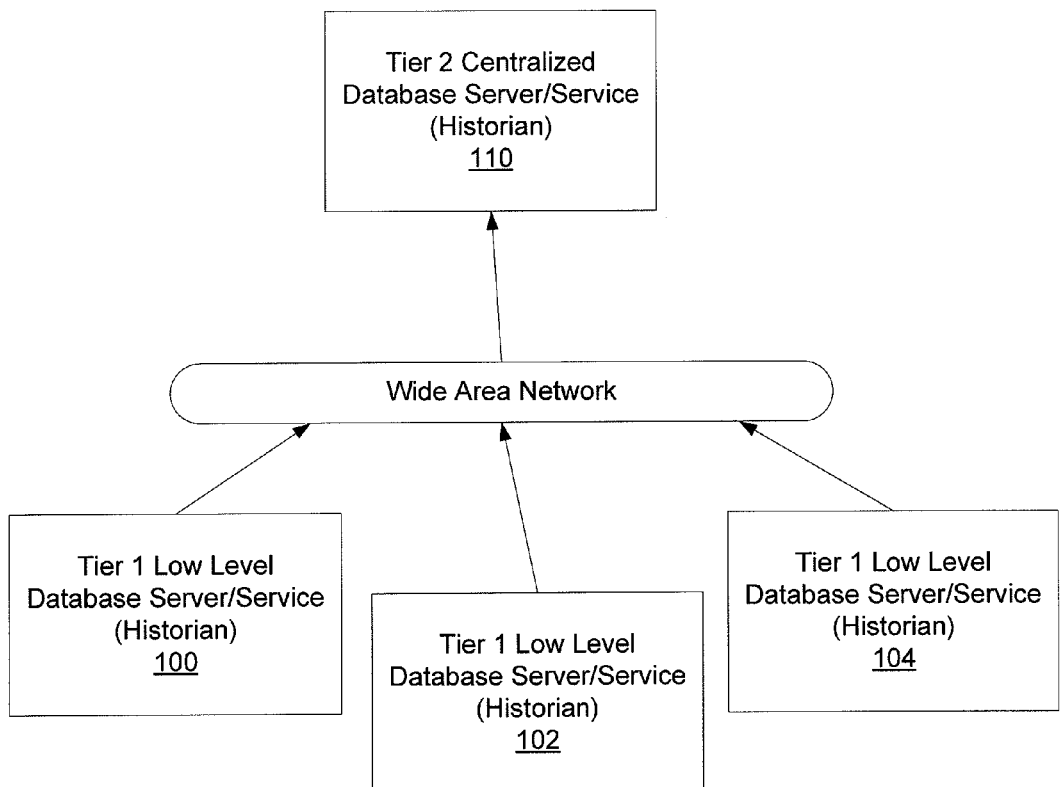
FIG. 1 is a schematic diagram of an exemplary networked environment wherein a set of process control historian databases provide data to a centralized tier two historian.

A tiered control system/plant historian service supports historian database replication operations wherein previously tabled data is replicated from potentially many "tier one" historians to a "tier two" historian. The term "tabled" is used herein to describe data received by the database/historian server and stored in an organized manner to facilitate later retrieval by the database/historian server in response to client requests. In the illustrative embodiments disclosed herein, basic historian functionality is extended to incorporate/provide an efficient and robust capability to replicate tag data from a set of tier one (lower level) historian to a tier two (upper level/central) historian in a tiered historian configuration.

A set of components/services have been added to a known historian architecture to provide enhanced functionality to address data volume and network communications costs associated with maintaining a centralized tier two (T2) historian containing process data originating from a set of tier one (T1) historian databases. The features include: (1) supporting disconnected replication connections between a T1 historian and a T2 historian, (2) supporting re-synchronization of replicated data in view of out-of-order receipt of replicated tag data by a T1 historian, and (3) supporting "summary replication tags" (analog and state) that provide a summary of a stream of real-time data received by a T1 server from a source.

Regarding the support of disconnected behaviors, the T1 historian described herein handles temporary disconnection of the communications between the T1 and T2 historians. Such disconnected behavior is described herein with regard to: (1) configuring replicated tags and (2) generating data by the T1 historian. In the exemplary embodiment described herein, replicated tags are configured and replicated data is prepared by a T1 historian even when the T1 historian is communicatively disconnected from a target T2 historian. When the connection between the T1 and T2 historians is established, the replication configuration and data generation (which previously occurred off-line) are provided by the T1 historian to the T2 historian. Both configuration and data generation are performed autonomously by the T1 historian.

Regarding the support of re-synchronization of timestamped out-of-order data received by the T1 historian, the T1 historian potentially performs re-synchronization of replicated data, in a tiered historian configuration, in the following exemplary circumstances:

(a) "Late data" is received by the T1 historian outside a time window specified by the historian for receiving "real-time" data (e.g., 30 seconds). Late data is associated in many cases with data originating from a remote telemetry unit (RTU).

(b) A previously disconnected data stream source has a connection restored to a T1 historian. Upon re-establishing the connection, in an exemplary embodiment the source of streamed data provides real-time data interspersed with data previously placed by the source in a store-forward memory when the connection was lost. The store-forward data is processed via the synchronization queue.

(c) A user makes manual changes to data previously stored in the T1 historian. Such changes may be entered in the T1 historian several hours or even days after original (potentially real-time) data is received and replicated by the T1 historian to a T2 historian.

When out-of-order data is received by the historian, a re-synchronization event is placed on a re-synchronization queue. The event is removed from the re-synchronization queue and processed to provide a replicated T2 tag value to an appropriate T2 historian. In cases where the late data is used to generate data for a summary replication tag, the T1 historian prepares an updated value structure for the T2 tag for the relevant period and re-submits the updated summary replication tag value to the T2 historian.

Regarding "summary replication" tags, efficiencies are realized in the disclosed tiered historian system by supporting summary replication tags in the T1 historian's replication service. The summary replication tags enable T1 historians to provide low resolution summary descriptions based upon a stream of high resolution data received by a T1 server. The T1 historian initially receives data for "summary replication tags" as a stream of non-summary data points for an identified tag. In accordance with a specified summary replication T2 tag, the T1 historian converts the streaming data for a time period (cycle) into a summary of the data received for the tag during the time period. The summary is thereafter transmitted by the T1 historian to the T2 historian. The supported types of summary replication tags include, in the illustrative example, "analog summary" and "state summary" replication tags.

"Summary replication" (e.g., analog, state, and counters)) involves analyzing and storing statistical information about the tag value at specified intervals, such as every 15 minutes. In an illustrative example, for summary replication, the reporting period (how often the data is sent from T1 to T2 historians) and summary period (the time frame of the summarized data stream for a particular data tag) are the same. For example, if the reporting period is 15 minutes, statistics will be stored for each 15 minute period, and are not configured for longer (e.g., 30 minute) or shorter (e.g., 5 minute) periods. Counter summaries present an amount of change of a measured variable over a particular period of time. Non-time-weighted summaries provide a variety of results (e.g., mean, standard deviation, etc.) from a statistical analysis of discrete samples of a tag value during a period of interest.

"Analog summary replication" involves a T1 historian providing summary statistics for analog tags to a T2 historian. The statistics are derived completely from analog data acquired during the designated summary interval. In the illustrative example, the set of analog summary statistics include the following values: minimum, maximum, time weighted average, point count, time good, standard deviation and integral. Timestamps are provided for minimum, maximum, first and last values. Standard deviation is time weighted. Moreover, the standard deviation values are not stored. Instead variance values are stored, and a standard deviation is calculated and provided from appropriate time stamped variance values. Analog summary replication can only be applied to analog tags.

"State summary replication" summarizes discrete state values for a tag during a specified summary period. The state summary replication tag facilitates analyzing discrete process variables, such as a machine state (e.g., running, starting, stopping, standby, off, etc.). Statistical information stored in a state summary replication tag includes a list of all states/values that occurred during the time period, the total time the tag was in each state, the number of times each state occurred the shortest/longest time in each state, avg. time in each state, and then "contained" versions of each. The "contained" designation refers to states that are entered and exited (begin/end) within period of interest (e.g., a shift). Thus, a state that begins/ends outside a period of interest is not "contained" within the period of interest. In an exemplary embodiment, state summary replication supports a large number of states. However, to ensure manageable data volume, state data may be dropped from a state summary replication message if too many states are entered for a particular tag during a reporting period (possibly based upon a minimum number of entries or aggregated time). In the illustrative example state summary replication tags are potentially generated from integer analog, discrete, and string tag data.

The T1 historian's replication service also supports simple (full data) replication which retains full data resolution. In the exemplary embodiment, only one level of replication is supported, and thus T2 historian tags cannot be configured for replication. However, further levels of replication are supported in alternative embodiments. "Simple replication" involves straight-forward copying of the tag data from a tier one (hereinafter "T1") historian to a tier two (hereinafter "T2") historian. When a tag is configured on a T1 historian for simple replication, all values stored at the T1 historian are replicated to the T1 historian. In the illustrative example, analog, discrete and string data tags can be configured for simple replication.

Having provided a high level summary of the illustrative operation/functionality of the illustrative T1/T2 replication arrangement, attention is directed to the figures and their associated written descriptions. It is noted that the following description is based on illustrative embodiments of the invention and should not be taken as limiting the invention with regard to alternative embodiments that are not explicitly described herein. Those skilled in the art will readily appreciate that the illustrative example in FIG. 1 represents a simplified configuration used for illustrative purposes. In particular, the systems within which the present invention is incorporated are substantially larger and the breadth of network connections between tier one/two historian database servers is greater.

In many instances, enterprises are spread over vast geographic regions. For example, a company may operate pipelines or power supply networks extending over hundreds or even thousands of miles, or any other of a number of production facilities over a wide geographic area. Such systems are ideal for incorporating a tiered historian architecture wherein at least one T1 historian (process database) operates at each distinct geographic location to accumulate process/production data at particular location. The information from the T1 historians located at the geographically distinct locations is thereafter replicated to a parent T2 historian operating at a hierarchical level above the various T1 historians. Referring to the illustrative example provided in FIG. 1, each one of a set of "tier one" historians (100, 102, and 104) accumulates local information associated with a localized plant. A centralized "tier two" historian 110 receives and accumulates sets of historical data acquired and passed on by each of the "tier one" historians (100, 102, and 104). The T1 historians are connected to the T2 historian, for example, by a corporate WAN. The network connecting the T1 historians to the T2 historian can be virtually any network link, and is not intended to be limiting. Though only three "tier one" historians are shown in FIG. 1, it is understood by those skilled in the art that potentially dozens or even hundreds of historians can be provided at tier one of a multi-tiered historian configuration.

Figure 2:
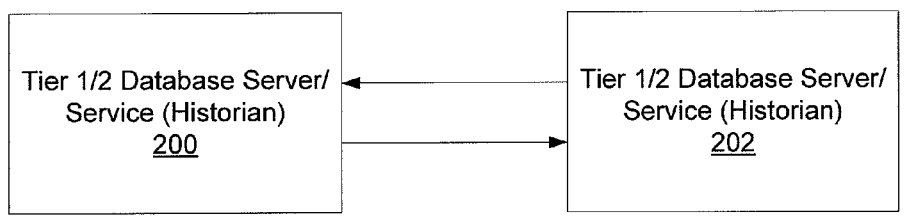
FIG. 2 is a schematic drawing of an alternative networked historian environment wherein two peer-to-peer historians operate as both a "tier one" and "tier two" historian.

The relationship of T1/T2 historians is not necessarily a "one-to-many" relationship. In an alternative embodiment, shown in FIG. 2, a peer-to-peer replication topology involving replicating historians 200 and 202 is illustratively depicted. Each one of the two historians 200/202 is both a "tier one" and "tier two" historian for purposes of implementing the procedures and functionality described herein below with regard to replication tasks/functionality associated with the distinct tiers (one and two) of the incorporation of asymmetrical/uni-directional replicating functionality multi-level/tiered historian topologies.

The above-described replication topologies are intended to be exemplary. There are virtually limitless tiered arrangements including ones where a T2 historian (receives replicated tag data from a T1 historian) is also a T1 historian (provides replicated tag data to another T2 historian) with regard to certain other tags.

Tags that are the subject of replication between tiered historians are also classified as either T1 or T2 based on whether they are a source or destination of replicated data. A T1 tag has values that are sent (either simple or summary replication form) to another historian. A T2 tag refers to a tag on a historian having values that are received from a replicating T1 historian.

Figure 3:
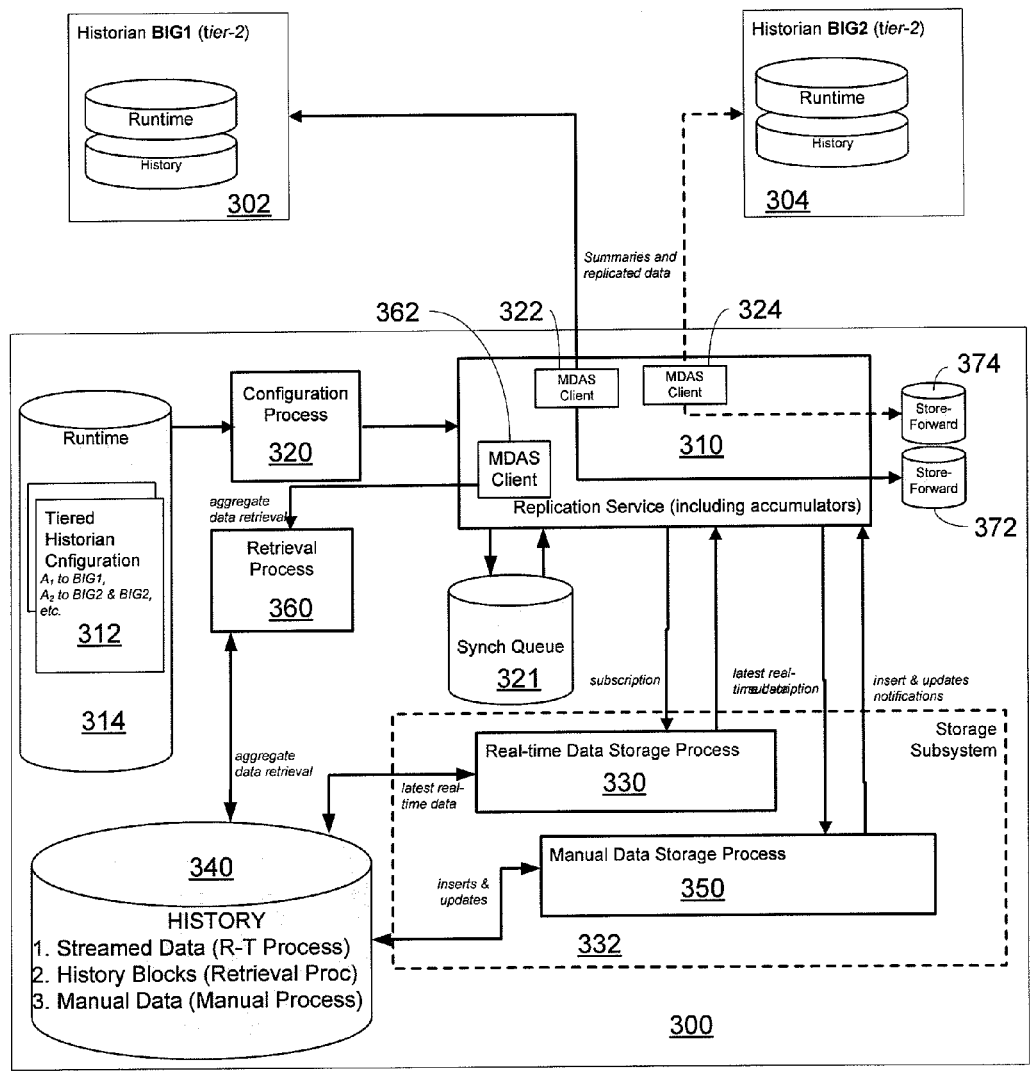
FIG. 3 is a schematic drawing of executable and data components of a tier one (T1) historian computer system.

Turning to FIG. 3, a schematic diagram identifies relevant executable and data components of a general architecture of a T1 historian system comprising computer-executable instructions stored on a computer readable medium and executed on the computer system to carry out the T1 functionality of a tiered historian arrangement described herein. The architecture summarized in FIG. 3 is illustrative and is not intended to limit the invention to any particular arrangement of software modules and their associated functionality.

It is noted in the illustrative embodiment, replication functionality (e.g., configuration of replicated tags, preparing summary tag data, tracking store-forward progress, etc.) is primarily carried out by a T1 historian 300 machine. The T2 historian (e.g., historians 302 and 304) plays a role of a replicated tag data receiver that (1) accepts replicated tag data from a T1 historian, and (2) stores the replicated tag data according to a configuration specified by the T1 historian 300. In the illustrative example, when a new T2 tag is configured by the T1 historian, the T1 historian generates a GUID for the new T2 tag. The GUID ensures that the T2 historian will be able to recognize the new T2 tag since the GUID will not be present in its current tables.

The T1 historian 300 machine implements the replication functionality of a tiered historian topology via a replication service 310. The operation of the replication service 310 is dictated by a tiered historian configuration 312 stored in a runtime database 314. The configuration 312 is defined using any of a variety of replication configurator user interfaces for defining/editing a replication configuration (i.e., define the parameters of a set of replicated T1 tags). The tiered historian configuration 312 is administered by the configuration service 320 to the replication service 310.

The tiered historian configuration 312 includes, by way of example, arrays of replication servers (e.g., replication service 310) and associated configured replication tags for each replication server. The configuration service 320 also maintains an array of custom replication schedules. On startup of the T1 historian 300, the configuration service 320 starts the replication service 310 and passes the tiered historian configuration 312 to the replication service 310.

After startup, the configuration service 320 is also responsible for passing the configuration 312 updates to the replication service 310 to support dynamically reconfiguring the T1 historian 300's replication tag definitions. The tiered historian configuration 312 is dynamically updated whenever a user performs a commit on changes made to the defined set of replication tags contained in the configuration 312 stored on the runtime database 314. By way of example, when a change to the replication tags is committed to the configuration 312, the configuration service 320 issues a notification to the affected replication service (e.g., replication service 310). In an exemplary embodiment, the notification contains a description of each changed server, replication tag, or custom schedule. As noted above, when a new T2 tag is defined by a user, the runtime database 314 issues a GUID for the new T2 tag to the configuration service. The configuration service 320 issues an appropriate notification to the replication service 310 to reconfigure its operation (e.g., create a new handler/accumulator) for the new T2 tag.

With regard to replication service configuration changes, in an illustrative example the following information is specified by the configuration service 320 in a re-configuration notification provided to the replication service 310: (1) a network name of the particular reconfigured replication server, and a set of fields defining the store-forward configuration for the server (e.g., minimum store-forward active state duration, file chunk size, sleep between chunks, connection timeout, buffer path, buffer free space, buffer count, etc.).

With regard to replication tag changes, the following information is specified: a network name of a replication server, a delete Boolean field (to instruct the recipient to delete the replication tag), a name of a source tag that is the subject of replication (either simple or summary) by the replication service—including at least a GUID (though a text name can also be provided), a time used to accumulate data for the tag in internal buffers (e.g., 1000 milliseconds).

With regard to custom replication schedule changes, the following information is specified: a delete Boolean field (for specifying the deletion of the schedule), a unique schedule name, a schedule type (interval/custom), in the case of an "interval" schedule an interval period is specified (along with a time unit applied to the interval period value), in the case of a "custom" schedule type a set of custom times of day specify offsets from midnight when events/actions are triggered on subscribers to the custom schedule.

The replication service 310 also supports modifying system parameters relating to replication on the T1 historian 300. The supported modifications include:

1. ReplicationStartDate that identifies an earliest point in time that has been configured for replication.

2. ExpectedLateDataDelay which specifies an expected 'lateness' of incoming data (e.g., 15 minutes).

3. TierSyncMergeTimeDistance which specifies a test for determining whether an already existing tier synchronization record should be merged with a new incoming synchronization record. If the two periods are closer to each other than the amount of time given in this parameter, the two records are merged to one. A default value for this parameter is 15 minutes.

The tiered historian architecture described herein enables configuration of replication tags and generation of data for such tags without the necessity of communications between a source T1 historian and a target T2 historian. Replication configuration is carried out through communications between the configuration service 312 and the replication service 310—both of which are located on a same T1 historian machine. The runtime database 314 on the T1 historian machine automatically generates T2 tag keys (the aforementioned GUID for a T2 tag). The T2 tag key is a GUID that uniquely identifies a stream of values for a replicated parameter maintained on the T1 historian. The GUID approach enables the T1 historian to create a key independent of the T1 historian and begin collecting data immediately rather than wait for the T2 historian to provide an identifier for the new T2 tag. The T2 keys, after creation by the runtime database 314, are provided to the replication service 310 via the configuration service 320. Thereafter, the replication service 310 uses the new T2 tag keys when communicating with the appropriate target T2 historian upon establishment of a connection between the T1 historian 300 and the target T2 historian (e.g., T2 historian 302).

The replication service 310 utilizes asynchronous communications with the T2 historian for purposes of sending replicated T2 tag data. Data acquisition services on the T1 historian 300 are responsible for ensuring the creation of a T2 tag on the target T2 historian and caching (in store-forward memory) streamed data locally (on the T1 historian 300) in case of a connection loss between the T1 and T2 historians—and forwarding the cached data to the target T2 Historian when a connection has been reestablished. Furthermore, in the case of non-streamed data the replication service 310 ensures that data is acceptable by the data acquisition service that is responsible for passing the data on to the target T2 historian.

When data is received "out-of-order" an event is generated and stored on a synchronization queue 321 for special processing by the replication service 321. The replication service 310 is responsible for ensuring that any data items received out of order, including for example manually entered non-streamed items being sent to the T2 historian, are not deleted from the synchronization queue 321 until the data acquisition service on the T2 historian confirms that the replicated data send operation to the T2 historian corresponding to the event on the synchronization queue 321 was successfully completed.

With continued reference to FIG. 3, in the illustrative example, the replication service 310 establishes connections to the T2 historians 302 and 304 through data acquisition service client interfaces 322 and 324 (e.g., Wonderware's well-known Magellan Data Acquisition Service "MDAS" client interface). The connections are used to create, in the T2 historians 302 and 304, T2 tags for storing the T1 tag data sent by the replication service 310 of the T1 historian 300 during tiered replication. As noted above, when a new T2 tag is created, the identifier (e.g., GUID) for the new T2 tag is supplied by the T1 historian. The T2 historian, upon receipt of the new GUID, verifies that it is indeed new by consulting a table of current T2 tags (GUIDs) for an identified replication connection with the identified T1 historian.

At runtime, the replication service 310 establishes a connection to a real-time storage process 330 of the T1 historian 300's storage subsystem 332. The replication service 310 establishes a subscriber relationship with the real-time storage process 330 to receive latest original streamed values that have been stored in a history database 340 for a configured set of T1 tags. In an exemplary embodiment, when the real-time storage process 330 detects new latest original values for subscribed T1 replication tags, the real-time storage process 330 passes the new values to the replication service 310 for further processing (e.g., replication to an appropriate T2 historian).

Furthermore, in the illustrative embodiment, the replication service 310 establishes a connection to a manual storage process 350 of the storage subsystem 332. The replication service 310 establishes a subscriber relationship with the manual storage process 350 to receive notifications of INSERTs, UPDATEs, and related store-forward events for tags used as data sources in real-time simple replication and summary replication operations/calculations. In the illustrative example, when the manual storage process 350 detects INSERTs, UPDATEs, or store-forward operations performed for replicated tags, the manual process 350 issues a notification to the replication service 310 to commence processing the changes to perform T1/T2 replication synchronization.

Moreover, the replication service 310 establishes a connection to a retrieval process 360 through a data acquisition service client interface 362 (e.g. MDAS client interface) to receive data that, due to a delay, is not being provided via the real-time storage process 330. In the case of summary replication tags, the retrieval process 360 includes accumulators that generate and provide the summary values from history blocks stored in the history database 340 for the replication service 310.

In the illustrative example, the summary tags are stored in the form of "structure tags" on T2 historians. The configuration of "structure tags" is maintained in the tiered historian configuration 312 of the runtime database 314. The structure tags are associated with a structure definition to guide recipients of structure values regarding how to pack/unpack/process the values associated with structure tags (e.g., summary tags)

As shown by way of example in FIG. 3, the replication service 310 establishes connections to the T2 historians 302 and 304, through client interfaces 322 and 324, to send the results of real-time simple replication and summary replication operations. The client interfaces 322 and 324 temporarily store the replicated data locally in independently maintained (one per connection to a T2 historian) store-forward memory 372 and 374 if the connections to the T2 historians 302 and 304 are not currently available. After a connection is re-established, the data is retrieved and passed by the client interfaces 322 and 324 to the T2 historians 302 and 304, respectively.

A detailed description of the operation/functionality of an illustrative example of the replication service 310 is provided below. As explained briefly above, the replication service 310 calculates transformations on real-time streamed data received by the T1 historian 300 for summary (analog/state) tags and then delivers the results to one of the T2 historians 302 and 304. In accordance with an illustrated exemplary embodiment, the T1 historian's replication service 310 is capable of being configured/reconfigured and operating (i.e., generating T2 tag data) under a current configuration without the existence of an active connection to a target T2 historian to which the replicated tag data is to be provided. Moreover, data that is the subject of replicated T2 tags can become "out-of-order" for a variety of reasons. When such data is received by the T1 historian 300, an event is generated and stored on the synchronization queue 321 for re-synchronization/back-filling processing by the replication service 310.

In the illustrative example, the replication service 310 operates independently of a storage process that populates the history database 340. Separating the replication service 310 from a storage process on the history database 340 reduces resource requirements for the storage process and enhances system robustness since one service can still operate when the other goes down.

Configuring/Re-configuring the T1 Historian for Replicated Tags

In operation, after the configuration service 320 confirms that the replication service 310 has successfully started, the configuration service 320 configures the replication service 310 by providing replication objects (defining T1 simple/summary replication tags) from the tiered historian configuration 312 stored in the runtime database 314. Each replication object includes a GUID generated by the runtime database 314 for each configured T2 tag. The T2 historian accepts a T2 value from the T1 historian having an unrecognized GUID as a new T2 tag request and creates a new replication table entry corresponding to the new GUID/T2 tag. The T2 historian is therefore unneeded to configure a new T2 tag and to generate values for the tag.

The replication service 310, using the replication objects (for both simple replication and summary tags), creates or verifies the existence of (if already created) T2 tags for a specified T2 historian. In cases where a connection to a specified T2 historian is unavailable at the time the replication service 310 seeks to create/verify a T2 tag for the specified T2 historian, the data acquisition client (e.g., client 322 or client 324) responsible for replication to the T2 historian of interest accepts the configuration information provided in the replication object. When the connection is established/reestablished with the T2 historian of interest, the data acquisition service client applies the configuration information to the configuration of the T2 historian.

With regard to persisting replication tags on the T2 historians, in the event a simple or summary replication T1 tag is deleted on the T1 historian, its corresponding T2 tag and previously stored data remains unchanged on the T2 historian. Keeping the T2 tag on the T2 historian allows retrieval of the replicated data previously collected by the T2 historian for the deleted T1 tag. Thus, deleting a T1 tag has the effect of stopping replication of data for a T1 tag to a corresponding T2 tag. However, previously replicated T2 tag data will persist on the T2 historian.

The runtime database of the T1 historian does not permit deletion of any input data tag that is the subject of replication (i.e., a simple or summary replication tag references the data tag in the runtime database). For example if a data tag is used at least once as a data source for simple or summary replication on the T1 historian, the data tag is identified as a T1 data tag—and cannot be deleted. However, if all T1 replication tags referencing the input data tag are either deleted or do not reference the T1 data tag anymore, then the tag is no longer classified as a T1 replication tag and can be deleted.

When the tiered historian configuration 312 is reconfigured, the configuration service 320 determines the changes to the simple replication and summary replication tags in the tiered historian configuration 312. The configuration service 320 reconfigures the replication service 310 by sending a notification containing the differences between the old and new versions of the tiered historian configuration 312. No full reconfiguration occurs, and data collection for tags not involved in the reconfiguration is not affected.

T2 Historian Replication Independence

The replication service 310 handles the T2 historians (e.g., T2 historians 302 and 304) independently from one other. The state and availability of a connection between the T1 historian 300 and either one of the configured T2 historians 302 and 304 has no effect on the other T2 historians. Every T2 historian is independently configured by the T1 historian replication service 310 for a store-forward operation mode that is entered, and configuration information and/or data points are stored locally on the T1 historian when a connection between the T1 historian and a corresponding T2 historian is (or becomes) unavailable.

When a connection becomes available between the T1 historian 300 and a particular one of the T2 historians (302 or 304), the replication service 310 forwards all store-forward data previously stored in a dedicated store-forward memory (e.g., store-forward memory 372 and 374) to the corresponding T2 historian when it becomes available and the following conditions hold true: (a) the T2 historian still exists in the runtime database of the T1 historian, and (b) the T2 historian is still enabled for store-forward operation.

Offline Operation of a T1 Historian

When a T2 historian, such as T2 historian 302 is unavailable, but configured in the tiered historian configuration 312 for store-forward operation, the T1 historian is able to carry out the following operations:

1. Add, modify, and delete simple replication objects in its configuration 312;

2. Add, modify, and delete summary objects in its configuration 312;

3. Store data locally for T2 tags created before the T2 historian became unavailable (i.e., a T2 replication tag can be created during T1 historian replication configuration without having an active connection between the T1 historian and the corresponding target T2 historian).

4. Store data locally for T2 tags created while the T2 historian is unavailable (i.e., a T2 tag can be defined AND data collection can begin even before establishing a connection between the T1 historian and the intended T2 historian).

After a connection between the T1 and T2 historians is restored, the replication service 310 synchronizes its locally stored configuration with the T2 historian (the T2 historian generating new T2 tags for new T2 tag GUIDs), and forwards all data stored in the store-forward memory to the T2 historian. While the T2 historian was offline (disconnected from the T1 historian) the simple and summary replication tag definition objects can be added, modified and deleted on the T1 historian. Moreover, the T1 historian can be started and shut down several times with some changes made every time along the way—without loss of configuration or replicated tag data. To ensure all relevant replication configuration and tag data are provided to the T2 historian, after a connection between a T1 historian and a T2 historian is restored, the following operations are performed:

(a) the replication service 310 compares a latest set of simple and/or summary replication definition objects with the T2 tags currently existing on the T2 historian and performs dynamic reconfiguration of the T2 historian if necessary to match a currently defined set of T1 replication tags for the re-connected T2 historian; and (b) a history of each reconfiguration of a replicated tag and associated data stored in corresponding store-forward memory is sent to the T2 historian to be merged into the T2 historian's T2 tag history. The resulting state of the reconnected T2 historian's database is the same as it would have been if the disconnection between the T1 and T2 historians had never happened.

Push Model Based Replication

In the illustrative embodiment, replication follows a push (data source initiated transfer) model to ensure that no data points are skipped regardless of data rate and the existence of data bursts. When the replication service 310 is no longer configured to replicate particular tagged data, the replication service 310 notifies the storage subsystem 332 to stop pushing data values corresponding to the deleted replication tag.

Preventing Data Overflows on T2

The T1 historian 300 stores incoming data (both real-time and old) for configured replication tags at some data rate "rt1." The replication service 310 performs transformation calculations over the replicated tag data and sends the results to the T2 historian, which is able to process it with some data rate "rt2." If due to insufficient system resources of the T2 historian, it happens that rt2 is less than rt1, the data being accumulated due to that difference is stored on the T1 historian side (as would occur in the case where a connection is lost between the T1 and T2 historian), before the replicated tag data is forwarded to the T2 for processing (when the T2 historian is able to handle it). The particular strategy for dealing with the processing speed limitations of the T2 historian depends upon the replication type and calculation conditions and is provided herein below.

Tier Synchronization Queue 321 Operation

Tier synchronization notifications (events) based on data arising from the manual storage process 350 are stored in the synchronization queue 321 on the T1 historian. The replication service 310 acts on the received notifications/events and removes these notifications/events from the queue 321 as soon as they have been successfully processed.

For example, if the user imports a CSV file to the T1 historian, containing a series of INSERTs from time t1 to t2 for a replicated tag A, a notification/event record {A, t1, t2} is added to the queue 321.

In an exemplary embodiment, to efficiently process late arriving data, notification/event records for a same T2 tag which fall within a specified time span are merged and processed together to potentially render a single replicated value for the covered period. The tier synchronization time span is stored as a system parameter. An exemplary default time span is 15 minutes.

Building upon the above example, if a user imports a CSV file on the T1 historian 300 containing a series of INSERTs from time t3 to t4 for the same specified tag "A", another notification record {A, t3, t4} is added to the queue 321. If timestamps t2 and t3 are within the defined maximum time span (e.g., 15 minutes), the two records are replaced by a single combined record {A, t1, t4}.

In an exemplary embodiment, a synchronization queue monitor provides a graphical user interface that enables a user to examine the queue 321 and monitor its length in real-time. In an exemplary embodiment, a maximum allowed size of the queue 321 is specified in the runtime database 314.

When the replication service 310 is unable to perform a scheduled summary calculation for any reason, a summary calculation record is added to the synchronization queue 321 about the event. When there are enough system resources available, or on a specific event from another subsystem, the replication service 310 removes the summary calculation record from the queue 321, performs summary calculations and provides the corresponding T2 tag data to a specified T2 historian.

Replicating Streamed Data Points For T2 Replication Tags

In a particular embodiment, the T1 historian 300 processes streamed data differently based upon whether the data is received within a real-time window (e.g., within 30 seconds of being generated by a data source). Streamed data that is received within the real-time window is processed by the replication service 310 to generate replication data for corresponding T2 tags. However, streamed data received outside the real-time window ("late data") is stored in the database 340 (as history blocks) and a corresponding event record is added to the synchronization queue 321. Replication of the late data stored in the database 340 is later carried out by the replication service 310 by processing the event record from the synchronization queue 321 using the retrieval process 360.

T2 Historian Overflow Prevention

If the T2 historian is unable to handle the incoming real-time data from the T1 historian 300, the replication service 310 detects that situation and switches the corresponding MDAS client (e.g., client 322) to a store-forward node. The data is thereafter accumulated locally in the store-forward memory (e.g., memory 372)

Synchronizing Values Between Tiers 1 and 2 for Streamed Data Points

All replicated tag values and their OPC qualities should be eventually identical on both tiers. However the exemplary embodiment allows tier synchronization delays, associated with processing events from the synchronization queue 321, to differ under different circumstances:

1. For latest original values fitting the real-time window of the T2 historian the tier synchronization delay is expected to be within a few seconds on a 100 Mb network.
2. For latest original values of tags not configured for late data and falling outside a real-time window of a T2 historian, the tier synchronization latency is expected to be within a few minutes on a 100 Mb network.
3. For latest original values of tags configured for late data and falling outside the real-time window of the T2 historian, the tier synchronization latency is expected to be within a few minutes on a 100 Mb network.

If a user submits an insert/update/csv for a replicated tag, the T1 historian 300 detects the change and at an end of a next tier synchronization cycle performs tier-synchronization. For that case the tier synchronization delay can be of any length depending on the amount of data to be sent by the T1 historian 300 to the T2 historian.

A data source of the T1 containing data for tags configured to be replicated can go to the store-forward mode. Later the store-forward data is merged into the history of the T2 historian. In such case the tier synchronization delay can be of any length depending from the amount of data to be sent to the T2 historian.

If any data modification is performed on the T2 history, including deletion of history blocks, no re-replication should occur to compensate for the modification. If another data modification is performed in the T1 historian 300 for the same tag and an intersected time interval, then the data modifications done manually on the T2 historian are overwritten by a tier synchronization mechanism within the T1 historian 300. The tier synchronization mechanism creates a new patch history blocks on the T2 historian when necessary.

Summary Replication Tags

The tiered historian example described herein includes configuration and runtime operations supporting the creation of summary replication tags that are calculated by a T1 historian from a stream of values for a data (e.g., analog or state) tag over a specified time cycle/period (e.g., every hour). Exemplary data structure schemas for two exemplary summary replication tags (analog and state) are described herein below with reference to FIGS. 4, 5 and 6.

Summary replication tags play an important role in the tiered historian architecture since the summary tags are capable of reducing hundreds or even thousands of data values for a particular source tag (received by a T1 historian) to a single summary of the received data values for a specified time period. The single summary is maintained as an instance of a T2 tag on a T2 historian. By digesting the real time data for a tag maintained by a T1 historian into a summary tag instance before forwarding the summary tag data to a T2 historian, substantial savings can be observed in the following areas: network traffic between T1 and T2 historians, memory consumption on T2 historians, and processing load on T2 historians. The aforementioned savings enables a single T2 historian to potentially archive summary data for a very large number (e.g., hundreds) of T1 historians for an enterprise. In the exemplary embodiment, analog and state summary replication tags are supported. However, other types of summary replication tags are contemplated where multiple data values in a stream for a particular data tag are processed by a T1 historian to render a summary of the processed data points—as opposed to simple replication where each data value in a stream is passed from a T1 historian to a T2 historian.

In the illustrative example, each real-time replication summary tag has a specified time cycle for which the replication service 310 calculates a summary T2 tag and then sends the summary T2 tag (with a cycle timestamp) to a specified T2 historian.

Turning to FIG. 4 a generic exemplary data structure schema is provided for Analog and Time-in-state (state) summary replication tags that are generated by a T1 historian and provided to a T2 historian for a specified T1 tag and cycle. The schemas for Analog and Time-in-state summary replication tags are described herein with regard to the content of a Value field 404. Details of the distinct Value field 404 structures for analog and state summary replication tags are described in FIGS. 5 and 6. Details of the creation and maintenance of summary replication tags (having the identified fields corresponding to database columns when stored on the T2 historian) are described herein after the description of the illustrative schemas.

Turning to FIG. 4, an analog replication summary tag includes a DateTime 400 containing a timestamp identifying a cycle with which the summary is associated (e.g., a cycle boundary).

A TagName 402 specifies a unique name assigned to the summary replication tag.

A Value 404 specifies the actual data value(s)/content for the summary replication tag. The details of this field are provided separately herein below with reference to FIG. 5 (analog summary replication tag) and FIG. 6 (state replication summary tag).

A Quality 406 contains an indicator providing a summary meaning for the related data item (e.g., good, bad, doubtful, initial, etc.).

A QualityDetail 408 contains a value specifying an internal representation of data quality.

An OPCQuality 410 specifies an OPC quality provided by a data source.

A wwTagKey 412 specifies an integer value corresponding to a database key assigned to the replicated tag within a single T1 historian (not necessarily unique across an enterprise comprising multiple T1 historians).

A wwRowCount 414 specifies an integer value corresponding to a number of rows (data values) to be returned for a specified time period. For cyclic retrieval, the rows are spaced evenly across the time period, and the default row count is 100 rows. For cyclic retrieval, the row count is applied for each tag in a query.

A wwResolution 416 specifies an integer value corresponding to a sampling rate, in milliseconds, for retrieving the data in cyclic mode. The system returns values stored over the requested time period at the interval specified by the resolution. For example, if a 5000 ms resolution is specified, the system queries for all data during the time period, and then only returns those values that occur at each 5000 ms interval, starting with the start date and ending with the end date.

A wwRetrievalMode 420 specifies a retrieval mode of multiple supported modes (e.g., time-in-state retrieval mode).

A wwTimeDeadband 422 specifies a minimum time, in milliseconds, between returned values for a single tag. The wwTimeDeadband 422 parameter applies only to delta retrieval.

A wwValueDeadband 424 specifies, by way of example, a percentage of full scale (range), in engineering units. Any value changes that are less than the percentage (value deadband) are not returned. The wwValueDeadband 424 applies only to delta retrieval. The default is 0.

A wwTimeZone 426 specifies a time zone for retrieval. In an illustrative example, by default, the retrieval subsystem converts the UTC (Universal Time Coordinated) timestamps for the stored data to the local time of a historian server computer, including adjustments for daylight savings time. In order to return the timestamps in UTC, a user sets the value of wwTimeZone to UTC. To convert the timestamps to a client computer's time zone, a user sets the wwTimeZone 426 parameter value to an appropriate time zone text key from a TimeZone table.

A wwVersion 428 specifies, if the original data values have been modified in the database, which version of the stored data is to be retrieved. Valid values for the wwVersion 428 parameter are: ORIGINAL or LATEST. If no value is specified, then the latest version of the data is retrieved by default.

A wwCycleCount 430 specifies a number of retrieval cycles (sub-intervals) for the specified time period for the summary tag. The cycles are spaced evenly across the time period. For example, if a user specifies a cycle count of four, the time period is divided into four evenly divided cycles, and one or more values (depending on the retrieval mode) are returned for each cycle within the specified time period.

A wwTimeStampRule 432 specifies whether cyclic results are timestamped at the beginning of the cycle or at the end of the cycle. Valid values are, for example, START and END. If no timestamp rule is specified, then retrieval uses a setting of a system TimeStampRule parameter.

A wwInterpolationType 434 specifies how analog signals will be interpreted (either stair step or linear) at points falling between to actual data points.

A wwQualityRule 436 specifies whether values with certain characteristics are explicitly excluded from consideration by data retrieval. The parameter value overrides a setting of a system QualityRule parameter value. Valid values are, for example, GOOD or EXTENDED. A quality rule of GOOD means that data values with doubtful OPC quality are not used in the retrieval calculations. A quality rule of EXTENDED means that data values with both good and doubtful OPC quality are used in the retrieval calculations Turning to FIG. 5, a set of sub-fields are identified for an exemplary Value field 404 for an analog summary replication tag. These fields define the functionality of an analog accumulator object in the replication service 310 (processing real-time data streams provided via the real-time data process 330) or the retrieval service 360 (in the case of late data) that supports generation of the analog summary replication tag. A StartDateTime 500 specifies a timestamp for a start of a cycle for a summary. A MinimumValue 502 contains a minimum value received for the analog tag during the cycle and a timestamp of the minimum value. A MaximumValue 504 contains a maximum value received for the analog tag during the cycle and a timestamp of when the maximum value occurred. A FirstValue 506 provides a first recorded value (and timestamp) within the cycle. A LastValue 508 provides a last recorded value (and timestamp) within the cycle. A Point-Count 510 provides an integer value corresponding to the total number of points for the tag were used to compute the analog summary replication tag for the cycle. An Integral 512 provides a value corresponding to the integral of values during the cycle. An IntegralOfSquares 514 specifies a value corresponding to an integral (time-weighted sum) of squared point values processed for the cycle. The above identified fields are exemplary, and alternative embodiments will include alternative sets of data provided for an analog summary replication tag.

Turning to FIG. 6, a set of sub-fields are identified for an exemplary Value field 404 for a state (time-in-state) summary replication tag. These fields define the functionality of a state accumulator object in the replication service 310 (processing real-time data streams provided via the real-time data process 330) or the retrieval service 360 (in the case of late data) that supports generation of the state summary replication tag. The information identified in items 602, 604, 606, 608, 610, 612, 614 and 616 in FIG. 6 is provided for each unique state encountered by an accumulator while processing received data for a period of interest. Furthermore, state summaries can have multiple values. A state can of course be binary (true/false, on/off). However, some state variables (e.g., a "flavor" state) can have more than two potential states, including states corresponding to particular integer values for a state variable. Thus, in the contrast to Analog summaries, State summaries are directed to measuring a duration for a particular discrete value during a period of interest.

A StartDateTime 600 specifies a timestamp for a start of a cycle for a summary. A MinimumContained 602 contains a minimum state time spent in a fully contained state during the cycle. A MaximumContained 604 contains a maximum state time spent in a fully contained state during the cycle. A TotalContained 606 provides a total state time spent in fully contained instances of the state during the cycle. A PartialStart 608 provides a time spent in a non-contained occurrence of the state during the start of the cycle. A PartialEnd 610 provides a time spent in a non-contained occurrence of the state during the end of a cycle. A NumberStateOccurrences 612 provides an integer value corresponding to the total number of fully contained occurrences of the state during the cycle. A NumericState 614 contains a value representing the state of interest for the state summary replication tag (in the case of an analog or discrete data source). A StringState 616 contains a string value corresponding to the state of interest for the state summary replication tag (in the case where the state of interest is provided in the form of a string). The above identified fields are exemplary, and alternative embodiments will include alternative sets of data provided for an analog summary replication tag.

Generating Summary Replication Tag Instances

Having described the general content of analog and state summary replication tags, attention is directed to the operation of a T1 historian that generates and provides the summary replication objects to a T2 historian on a cyclic basis. In the illustrative embodiment, the content of summary replication tags is generated by an accumulator object defined for a particular tag and repetition cycle. Thus, an accumulator for a summary replication tag, viewed at a particular point in time, contains data for a particular time period and summary replicated tag. Once defined and started, an accumulator operates to calculate aggregate values for a particular repetition period (cycle) for a specified data source tag (to which the accumulator subscribes). One or more accumulators for a specified data source tag generate summary values from aggregated data during a given period. An example, an Average accumulator calculates a time-weighted average of a data source tag. The accumulators thus provide, in various embodiments, different types of statistical measures based on a stream of values for a particular data source tag over a period of time.

Accumulators

Figure 7:
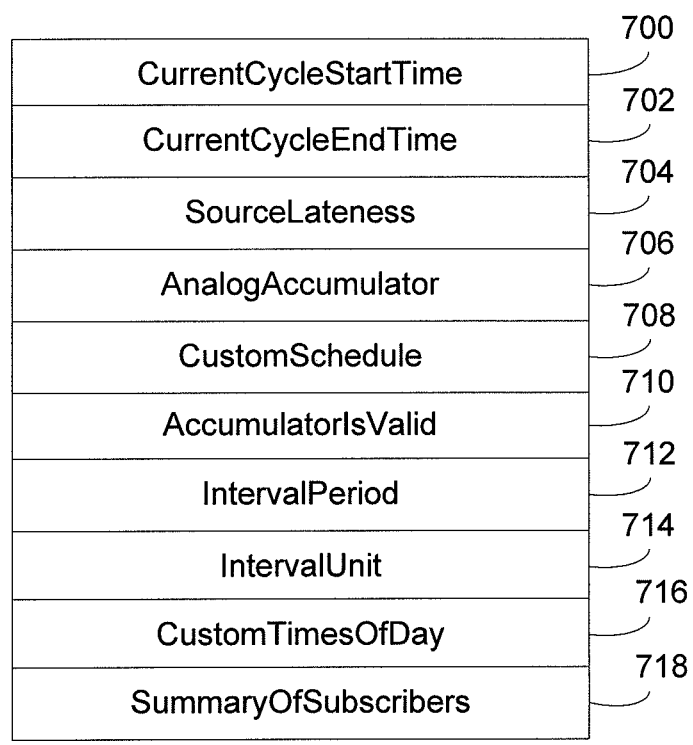
FIG. 7 is a summary of an accumulator base class object used to create instances of analog and state summary accumulators in accordance with an exemplary embodiment.

Turning to FIG. 7, an accumulator base class is summarized that defines the basic operation of the analog and state summary replication accumulators. The state and analog subclasses differ in the data processed and values generated in accordance with the contents of the value field in the state and analog summary replication tags. A CurrentCycleStartTime 700 and CurrentCycleEndTime 702 specify a calculation period of the cycle. The accumulator is only interested in received data for a tag having timestamps falling within the period specified by the cycle start/end times. A SourceLateness 704 specifies a predicted delay period between the time of the timestamp on the received tag data and when the data is actually received by the T1 historian's replication service. An AnalogAccumulator 706 specifies whether the accumulator generates an analog summary value. A CustomSchedule 708 specifies whether the accumulator is using a custom schedule. An AccumulatorIsValid 710 specifies whether the accumulator believes the accumulated data is valid for the entire specified cycle. An IntervalPeriod 712 specifies an interval period of a schedule used by the accumulator if the schedule is not custom. An interval unit 714 specifies a unit of the interval period (e.g., hour, day, etc.). A CustomTimesOfDay 716 defines boundaries of a custom schedule for the accumulator. A SummaryOfSubscribers 718 specifies a list of subscribers to the accumulator's summary data.

Analog Accumulator

An exemplary analog accumulator object comprises attributes used to calculate an analog summary replication point for a specified tag and cycle. As streamed original data point values are received by the replication service 310 based upon previously specified subscriptions with the real-time data storage process 330, the values are dispatched to their potentially multiple subscribers (e.g., accumulator object instances) within the replication service 310. When an analog summary replication is configured for a given source tag, then an instance of the analog summary accumulator object class produces the summary points for the analog summary replication tag, and the accumulator will appear as one of the subscribers to the source data tag.

In an exemplary embodiment the analog summary accumulator receives a stream of data points for a subscribed data tag. For each received data point value, the analog accumulator executes the following:

1. Compares the incoming value with the prior minimum to determine if the value is a new minimum value for the cycle.

2. Compares the incoming value with the prior maximum to determine if the value is the new maximum value for the cycle.

3. Compares the incoming timestamp with the timestamp of the current first value for the cycle to determine if the data point is a new first value (according to timestamp) in the cycle.

4. Compares the incoming timestamp with that of the prior last value in order to determine if the data point is a new last value in the cycle.

5. Increment the number of total values used in the cycle.

6. Add to all the time weighted sums. The time weighted sum calculated for the received analog tag value is determined using the time period that has elapsed since the previous received/processed time-stamped value for the tag.

7. Keep track of total time spent in non-NULL states.

8. Calculate a quality to use for the summary point.

At a point in time, an analog accumulator completes computations for a cycle and provides the data for purposes of generating an analog summary replication tag for a particular T2 tag/cycle combination. A determination that a summary replication point for an analog tag can be reached in at least two ways: (1) an incoming point for a source tag has a timestamp that falls after the end of the current cycle, in which case the accumulator initiates changing the current cycle; or no points have come in beyond the end time of the current cycle, but the cycle expires, and a detector thread responsible for this accumulator changes the current cycle.

When the current cycle is changed on an accumulator object, the accumulator object produces an analog summary point for the just completed cycle by performing calculations for integrals and integral of squares. The accumulator object then adds the produced point to a data structure (e.g., vector) holding analog summary replication points to send to each subscribing T2 historian. Finally attributes of the current (new) cycle are initialized, and the current cycle start time and current cycle end time are set in a newly defined accumulator on a specified tag for the new cycle.

State Accumulator

An exemplary state accumulator object comprises attributes used to calculate and describe occupation of a particular specified state by a source tag during a time period (cycle). The accumulator includes an attribute specifying whether the source tag provides string data values. State map attributes store a listing of all string/numeric states found in a calculation cycle.

As streamed original data points are received by the replication service 310, from the real-time data service 330, based upon real-time data tag prescription, the data point values are dispatched to the potentially multiple accumulator object subscribers. When a state summary replication tag has been configured for a given source tag, then an instance of a state summary accumulator is responsible for producing the summary points for the state summary replication tag, and the accumulator appears as a subscriber to the source tag.

In response to receiving a new point for the source tag, the state accumulator object determines whether the identified state has already been encountered earlier in the cycle. This is done, by way of example, by performing a lookup in the relevant string/numeric state map attribute. If the state is not found in the map, then an instance of a state summary point object is created for the new state and the new state type is added to the appropriate state map attribute on the accumulator object, and the newly created state summary point object instance is the target of summary calculations performed for the incoming point. In an exemplary embodiment, a maximum number of states value is specified to limit the number of states for which corresponding accumulators are maintained. If the state has been seen before in this calculation cycle, then the summary calculations are performed on the data instance already found in the state map. The calculations result in the production of the data identified in FIG. 6.

At a point in time, the accumulator completes computations for a cycle and provides the data for purposes of generating a state summary replication tag for a particular T2 tag/cycle combination. A determination that a summary replication point for a tag can be reached in at least two ways: (1) an incoming point for a source tag has a timestamp that falls after the end of the current cycle, in which case the accumulator itself changes the current cycle; or no points have come in beyond the end time of the current cycle, but the cycle expires, and the detector thread responsible for this accumulator changes the current cycle.

When the current cycle is changed on a state accumulator object, the accumulator object produces all the state summary points (one for each represented state during the cycle) for the just completed cycle by performing calculations for rendering the information identified in FIG. 6 for each state represented in the map attribute of the accumulator. The accumulator object then adds the produced point to a data structure (e.g., vector) holding state summary replication points to send to each subscribing T2 historian. Finally the attributes of the state accumulator are reset for the next/current cycle (including clearing the state map), and the current cycle start time and current cycle end time are set.

Accumulator's End of Accumulation Period (For a Cycle)

As noted previously above, in an exemplary embodiment, expiration of period for an accumulator processing received data for a particular cycle is determined through either one of two ways: (1) a value is received outside the accumulator's cycle period, or (2) the accumulator receives a signal from a supervisory process/thread after a configured delay period expires after the end of the time period for the accumulator's cycle.

In the first case, the accumulator determines that a timestamp on a received data point falls after its cycle window. Since the data is presumed to be in time-sequence order, the accumulator does not expect any further data points to be provided for its tag/cycle. The accumulator commences operations to generate and provide a T2 replication tag value for forwarding to an appropriate T2 historian.

In the second case, receiving a signal from a supervisory process/thread, because some source tags corresponding to replication tags are either slow-changing or non-changing in relation to a cycle time period, a data point having a timestamp indicating data is being sent by a source for a next cycle (and thus the accumulator can cease its data receiving and provide a value for forwarding to a T2 historian) may not be received until well after the actual cycle ends for the accumulator. In such cases the replication service 310 provides an end-of-cycle signal to the accumulator at a configured point in time after the cycle has ended. The delay period for sending an end-of-cycle signal to a particular accumulator can be based upon either a system (default), a custom (accumulator-specific) time period, or both.

In an exemplary embodiment, the end of accumulation cycle supervisory processes/threads factor in an expected lateness for the tag's data source based upon multiple sources. As noted above, a summary replication tag descriptor (see, SourceLateness 704 described herein above) supports specifying a tag-specific delay. Furthermore, detectors factor in a system-specified expected delay. The system-specified delay corresponds to a minimum delay for all summary replication tags and the tag-specified delay is added to the system-specified delay to render a delay for the particular accumulator. Therefore, in the illustrative embodiment, an accumulator's period for receiving data points for a particular cycle will not end until the accumulator's tag-specified delay plus the system-specified delay time have elapsed (after the current cycle end time 702). If a point for a subsequent cycle has already been detected by the accumulator, then the accumulator will already have ended its period of receiving data points for the cycle, and the signal provided by the supervisory process is ignored.

Upon detecting the end of the accumulation period, the accumulator produces its one or multiple summary data points for the cycle. The produced data points are then forwarded to all subscribing T2 historians. In an exemplary embodiment, the data points are added to data acquisition service client interface-specific (e.g., DAS client interface 322 or 324) buffers for transmission from the T1 historian 300 to a particular T2 historian. In an exemplary embodiment, rather than create a new accumulator instance for each summary replication tag definition, an accumulator "re-defines" itself (by resetting the values in the current cycle start/end times 700 and 702). The accumulator resets the start/end times when the above-described end of accumulation period is determined for a current cycle.

Figure 8:
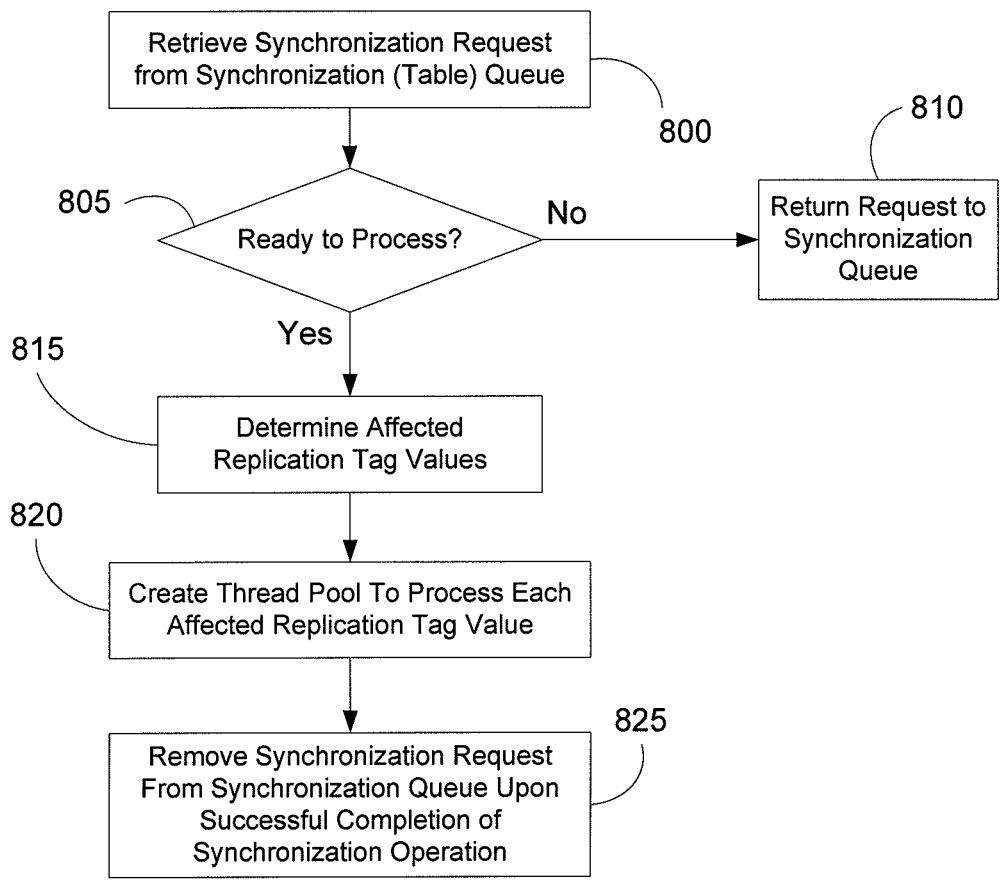
FIG. 8 is a flowchart summarizing a set of steps for processing events/requests placed on the synchronization queue of a T1 historian in accordance with an exemplary embodiment.

Accumulators' Use of the Synchronization Queue (FIG. 8)

Accumulators place requests/events on the synchronization queue 321 relating to a summary for a particular cycle when either of the two circumstances is encountered:

(1) The accumulator is set to an "invalid" state. This will be the case after start-up, and when the T1 historian is disconnected from the accumulator's data source. In the case of disconnection, a request is placed on the synchronization queue 321 for 'new originals' after the accumulator has successfully placed its summary value in a T2 replication buffer (upon expiration of the cycle period plus delay) to ensure that corrected data will be replicated for the cycle after the incorrect data is initially stored on the T2 historian.

(2) A forward time shift spanning multiple calculation cycles has occurred. If a new point is received for a time frame, which is further into the future than the next/subsequent cycle (i.e., an entire cycle was skipped), then the accumulator changes the cycle according to the timestamp of the new point. The new current cycle is marked invalid, and "new originals" requests/events are placed on the synchronization queue 321 corresponding to each skipped accumulator cycle starting with the previous current cycle.

Accumulators received points belonging to previously completed (old) cycles under limited conditions. In an illustrative embodiment, a streamed point belonging to a cycle prior to the current cycle can only be received as the very first point immediately after start-up of the replication service 310 (because the storage system protects the T1 historian 300 from backward time shift by adding 5 milliseconds to a time stamp of the last stored point, when out-of-sequence points are received). Thus, if the received data is out of sequence, then the time periods are adjusted so that the received data is in-sequence, and the data quality is flagged to denote the changed timestamps. As a consequence the response by an accumulator to receiving a streamed point older than the current cycle will be to change the current cycle to the one that actually receives the streamed point, and the accumulator is at the same time marked invalid to ensure the new current cycle is added to the synchronization queue 321 when the accumulator value for the new (older) cycle is replicated to a T2 historian following the accumulators' completion of the cycle containing the received "older" point.

In the illustrative example, the accumulator validity is re-evaluated with each incoming point and at the end of the accumulator's cycle. Thus, if an incoming point represents a disconnection from a tag's data source, then the accumulator validity is set to false (and a request is placed on the synchronization queue 321 corresponding to the cycle). If the accumulator is valid when a new cycle is signaled, then the just completed cycle is set to valid (and thus a request corresponding to the completed cycle is not added to the synchronization queue 321).

In an exemplary embodiment, the delay in receiving data from a source (i.e., "lateness") is used to dynamically adjust the SourceLateness 704 for the accumulator. The value of the SourceLateness 704 is forced to be at least a system-configured minimum. However, the value of the SourceLateness 704 is increased to match a delay observed for receiving any point that exceeds the current stored value of the SourceLateness 704. Moreover, the value of the SourceLateness 704 is dynamically lowered via a time-based filter that causes a gradual reduction of the value in response to a series of received values having lower lateness values—such as when a time synchronization problem is corrected.

Regarding forward time shifts (greater than a next cycle), a special exceptional operation state of an accumulator is entered when the time for a given source tag is shifted forward, i.e. closer to the current actual time, in such a way that multiple calculation cycles need to be calculated (i.e., the timestamp caused a skipping of an intermediate cycle between the current cycle and the one corresponding to the just received data point).

In an exemplary embodiment, the accumulator responds by changing the accumulator's current cycle (indicated by fields 700 and 702 of the accumulator descriptor) to the cycle corresponding to the received streamed point. The accumulator for the new (forward-shifted) cycle is marked invalid to ensure a request corresponding to the cycle is added to the synchronization queue 321 when the accumulator's value is replicated to the T2 historian following normal cycle expiration. Moreover, requests for "new originals" are placed on the synchronization queue 321 for the cycle that was interrupted by the receipt of the forward-shifted data (causing the exceptional state) as well as each skipped intermediate cycle (from oldest to newest cycle) to ensure proper calculation of any time-dependent values when the requests are processed from the synchronization queue.

As a result of the logic employed by the accumulators to determine/signal the end of processing data for a current cycle, if the actual late data delay is longer than the specified system parameter, then the result of the summary calculation may be incorrect. However, when the missing values finally arrive for processing via a request previously added to the synchronization queue 321, the previously calculated summary replication tag instance for the relevant time cycle is recalculated via the retrieval process 360 in concert with the replication service 360 processing the request from the synchronization queue 321, and the new correct "original" summary value is sent to the T2 historian to replace the previously received incorrect one.

Summary Replication Tag Value Synchronization Based on Out-of-Cycle Data Processing In the illustrative example, the T1 historian 300 maintains synchronization between the summary replication tag values in the T1 and T2 historians such that if data is received out-of-cycle with respect to the real-time data streams processed by the replication service 310's accumulators, affected summary replication value calculations are re-calculated, and the results are sent by the T1 historian to the T2 historian in the form of a tier synchronization operation. Examples of instances where data is received out-of-cycle include when: a user performs insert/update on old data used as a source for summary calculations, a data source is disconnected resulting in sending store-forward data out of order, and data is delayed in reaching the T1 historian from a summary replication tag's source.

"Original" vs. "Latest" Summary Replication Tag Values

Before describing the operation of the synchronization queue 321 and re-synchronizing the T1 and T2 historian databases in view of out-of-cycle processing of data streams, it is noted that in the illustrative embodiment, two types of re-calculated summary replication values are identified when sent to the T2 historian. The type of re-calculated summary replication value is based upon whether the newly applied data is unmodified "original" data or "corrected" data (e.g., a sensor malfunction caused erroneous readings). If a summary replication tag value for a cycle is re-calculated to account for original data that is merely processed outside the normal "current cycle" of the replication service 310's real-time data stream-based accumulator for the tag, then an "original" summary replication tag value is sent that replaces an original value for the tag on the T2 historian. Otherwise, if the new summary tag value arises from a correction to an actual data point used to calculate a previous summary tag value, then a request will be added to the synchronization queue 321 corresponding to any summary replication tag values affected by the change to the actual data point value(s). In the case of corrected point value, the summary replication tag value is identified as "latest" replication value which cannot overwrite an "original" value for the tag (to ensure preserving a value generated from unmodified system-generated original values).

The synchronization queue 321, by way of example, is maintained in a separate database on the T1 historian 300. The synchronization queue 321 while referred to as a "queue", is in fact not limited to processing request entries in FIFO order. Instead, in the illustrative example, the synchronization queue 321 is implemented as a table of synchronization requests (events) arising from out-of-cycle data that prevents creation of a summary replication tag value for a current cycle by an accumulator in the replication service 310. Using a table structure rather than a queue facilitates merging a set of smaller dirty periods into a single larger time period for processing.

Each pending request on the synchronization queue 321 includes:

1. a source tag name (the source of data for a summary replication tag), 2. a request identification (unique identification of the request in the Synchronization queue 321);

3. a request version (identifying whether the request involves "original" or "latest" (i.e., modified/corrected) data;

4. start/end time (time period affected by the modifications—can exceed a cycle in instances where pending synchronization requests have been merged to form a single request); and 5. earliest execution (specifying the earliest point in time after which the request can be serviced).

As can be seen from the above definition the sync request table will contain data describing dirty periods for the source tags only. The translation into which replication tags are affected is therefore performed when a request is serviced.

Turning to FIG. 8, a set of steps are summarized that describe the operation of an exemplary process/thread for servicing the requests from the synchronization queue—alternatively referred to as "backfilling" the replicated T1 information. Such requests arise, for example, from the replication service 310's accumulator encountering data having a timestamp that falls outside the time period for the current cycle for a particular summary replication tag handled by the accumulator. During step 800, the synchronization queue 321 processing thread retrieves a request (or set of requests) from the synchronization queue. If, at step 805, the time indicated for earliest processing of the request has not been reached, then control passes to step 810 wherein the request is returned to the synchronization queue 321 (table). If, however, the prescribed processing delay period has expired, then control passes from step 805 to step 815.

At step 815, the synchronization queue request processor determines the set of replication tags values affected by the request. The request potentially affects a "latest" or both "latest" and "originals." The types of replication involved in the request may be simple, analog, or state. A single request can arise from multiple merged replication requests over multiple cycles. In case of analog and state summary replication tags, the request processor determines each calculation cycle affected by the synchronization request.

Thereafter, during step 820, a thread pool is created to handle each distinct replication tag value identified during step 815. Each thread is responsible for producing the point values for the tags, sending the tag values to the replication server 310, and reporting successful completion of the replicated tag value update task. In an exemplary embodiment, obtaining a point value for a tag is carried out by calling the retrieval process 360 to produce a simple, analog summary, or state summary replication point (in original and/or latest version). Accumulators utilized by the retrieval process 360, in contrast to the accumulators of the replication service 310, generate summary analog and state replication values from history blocks (as opposed to real-time streaming data from which the replication service 310 accumulators calculate summary replication tag values.

The replication point values returned by the retrieval process 360 (via a data acquisition service interface) are passed to the T2 historian 302 or 304 via the designated one of the data acquisition service interfaces 322 and 324. In the illustrative example, the threads block on the transmission of data to the T2 historian to ensure the transactional data has been successfully stored.

Figure 9:
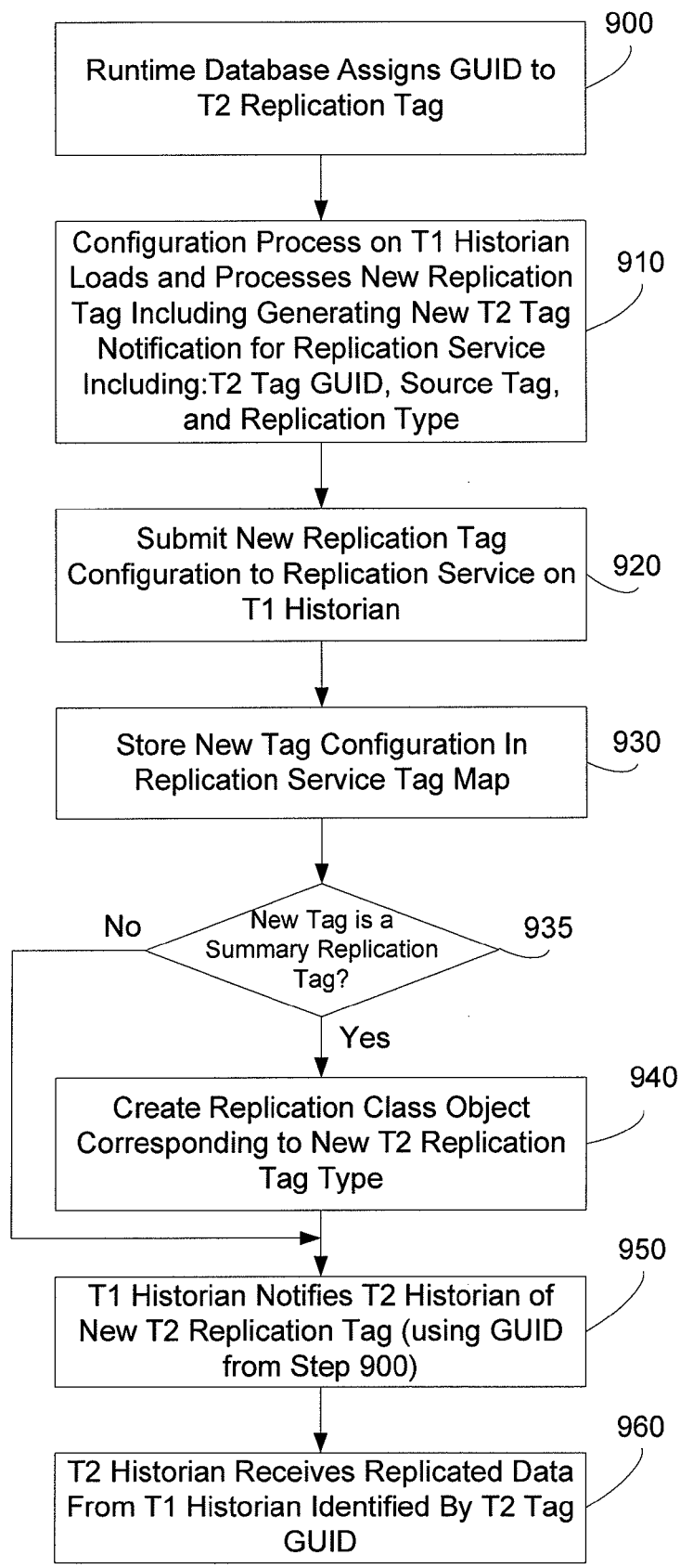
FIG. 9 is a flowchart summarizing a set of steps for creating new T2 replication tags by a T1 historian in accordance with an exemplary embodiment.

Turning to FIG. 9, a set of steps summarize the creation of new T2 replication tags by the T1 historian 310. In the illustrative embodiment, the T1 historian 310 creates new T2 replication tags without reliance upon a T2 historian that is the intended target of the replication. In particular, during step 900, when a user makes changes to a replication tag configuration (including creating a new tag and modifying an existing tag) maintained in the runtime database 314 for the configuration process 320, the runtime database 314 assigns a GUID to the replication tag.

In response to the change to the replication configuration (including replication servers, replication tags, and replication schedules) resulting from the commit of a new T2 replication tag, at step 910, the configuration process 320 loads and processes the new T2 replication tag. The processing during step 910 includes generating a notification to the replication service 310 identifying the new replication tag and its associated configured parameters including: a T2 replication tag GUID, source tag, and type of replication (simple, analog, state, etc.).

During step 920, the configuration process 320 submits the new T2 replication tag configuration parameters to the replication service 310. In response, at step 930 the replication service 310 generates a new T2 replication tag entry in a replication tag map on the T1 historian 300. The new T2 replication tag entry includes the GUID assigned by the runtime database 314 when the new T2 replication tag was initially created (thereby invoking a process for reconfiguring the T1 historian 300).

During step 935, if the new T2 replication tag is a summary replication tag, then control passes to step 940. During step 940 the replication service 310 creates an appropriate summary replication T2 replication class object for handling an identified source tag for the identified T2 replication tag. In the case of summary replication (analog or state) a subscription is established between an accumulator on the replication service 310 corresponding to the new T2 replication tag and a source of the specified summary replication tag data via the real-time data storage process 330 for providing streaming real-time data from the identified source tag. Upon creating the new T2 replication tag entry and data subscriber link, the replication service 310 commences generating T2 replication tag data without the need for any initial communication between the T1 historian and T2 historian that is the target of replication. Control passes from step 940 to step 950.

Referring again to step 935, in the illustrative embodiment simple (non-summary) replication does not use accumulators. Instead, all new values are transmitted directly to a designated destination. In the case of simple replication, an appropriate subscriber link is established between a simple replication handler on the replication service 310 and a source of the specified tag data via the real-time data storage process 330 for providing streaming real-time data from the identified source tag. Therefore, in the illustrative example, step 940 is by-passed in the case of simple replication tags and control passes directly to step 950.

In accordance with an exemplary embodiment, at step 950, the T1 historian 300 notifies a designated one of the T2 historians 302 or 304 of the new T2 replication tag. The T2 historian uses the GUID assigned to the new T2 replication tag by the runtime database 314 during step 900 as the tag key in the replicated tag database of the T2 historian. The new T2 replication tag's GUID uniquely identifies the new T2 replication tag on the T2 historian for purposes of tabling received data from the T1 historian 300 during step 960 corresponding to the new T2 replication tag.

In view of the many possible embodiments to which the principles of this invention may be applied, it should be recognized that the embodiments described herein with respect to the drawing figures, as well as the described alternatives, are meant to be illustrative only and should not be taken as limiting the scope of the invention. The functional components disclosed herein can be incorporated into a variety of programmed computer systems as computer-executable instructions (provided on a computer-readable medium) in the form of software, firmware, and/or hardware. Furthermore, the illustrative steps may be modified, supplemented and/or reordered without deviating from the invention. Therefore, the invention as described herein contemplates all such embodiments as may come within the scope of the following claims and equivalents thereof.

What is claimed is:

1. A multi-tiered replicated process database supporting replication between tiers, the multi-tiered replicated process database comprising:
a tier one (T1) database server computer comprising:
a process history database,
a replication service comprising a set of accumulators, each accumulator being adapted to render a summary T2 database tag data structure from a set of data values retrieved from the process history database for a specified T1 database tag;
a tier two (T2) database server computer comprising a consolidated database including process data replicated from a set of T1 database servers, wherein at least a portion of the process data replicated from the set of T1 database servers is summary T2 database tag data rendered by the set of accumulators;
a network including a communication link between the T1 database server computer and the T2 database server computer;
wherein the T1 database server computer further comprises a synchronization request storage, the synchronization request storage being adapted to store a set of events corresponding to replicating out-of-order data to the T2 database, and the replication service being adapted to process a synchronization request retrieved from the synchronization request storage to render an updated replicated value for storage on the T2 database server computer; and
wherein a delay in receiving the out-of-order data from a source is used to dynamically adjust a sourcelateness for the accumulator, said sourcelateness representing a predicted delay period between a timestamp on the received data and when the data is actually received by the replication service, said adjustment increased or decreased if said delay exceeds or is lower than the sourcelateness value, and wherein the sourcelateness is lowered using a time-based filter that causes a gradual reduction of the sourcelateness to a series of values having a lower lateness value than said sourcelateness.

2. The multi-tiered replicated process database of claim 1 wherein the set of data values retrieved from the process history database for the specified T1 database tag are analog values.

3. The multi-tiered replicated process database of claim 1 wherein the set of data values retrieved from the process history database for the specified T1 database tag are state values.

4. The multi-tiered replicated process database of claim 1 wherein the out-of-order data is late data received after a transmission delay by the T1 database server computer.

5. The multi-tiered replicated process database of claim 1 wherein the out-of-order data is manually entered data for a T1 database tag.

6. The multi-tiered replicated process database of claim 1 wherein the T1 database server computer supports configuration of a new summary T2 database tag while disconnected from the T2 database server computer.

7. The multi-tiered replication process database of claim 6 wherein a globally unique identification is generated by the T1 database server computer for assignment to the new summary T2 database tag.

8. The multi-tiered replication process database of claim 6 wherein the T1 database server computer supports, after the configuration of the new summary T2 database tag, generating a summary T2 database tag value prior to establishing a corresponding T2 replication tag on the T2 database server computer.

9. A method for replicating data in a multi-tiered replicated process database including a tier one (T1) database server computer and a tier two (T2) database server computer, and a network including a communication link between the T1 database server computer and the T2 database server computer, the method comprising:

maintaining, by the T1 database server computer, a process history database;

executing, by the T1 database server computer, a replication service comprising a set of accumulators, each accumulator being adapted to render a summary T2 database tag data structure from a set of data values retrieved from the process history database for a specified T1 database tag;

storing, by the synchronization request storage, a set of events corresponding to replicating out-of-order data to the T2 database;

processing, by the replication service, a synchronization request retrieved from the synchronization request storage to render an updated replicated value for storage on the T2 database server computer; and wherein a delay in receiving data from a source is used to dynamically adjust a sourcelateness for the accumulator, said sourcelateness representing a predicted delay period between a timestamp on the received data and when the data is actually received by the replication service, said adjustment increased or decreased if said delay exceeds or is lower than the sourcelateness value, and wherein the sourcelateness is lowered using a time-based filter that causes a gradual reduction of the sourcelateness to a series of values having a lower lateness value than said sourcelateness; and maintaining, by the T2 database server computer, a consolidated database including process data replicated from a set of T1 database servers, wherein at least a portion of the process data replicated from the set of T1 database servers is summary T2 database tag data rendered by the set of accumulators.

10. The method of claim 9 wherein the set of data values retrieved from the process history database for the specified T1 database tag are analog values.

11. The method of claim 9 wherein the set of data values retrieved from the process history database for the specified T1 database tag are state values.

12. The method of claim 9 wherein the out-of-order data is late data received after a transmission delay by the T1 database server computer.

13. The method of claim 9 wherein the out-of-order data is manually entered data for a T1 database tag.

14. The method of claim 9 further comprising the step of: configuring, by the T1 database server computer, a new summary T2 database tag while the T1 database server computer is disconnected from the T2 database server computer.

15. The method of claim 14 wherein the configuring step comprises generating, by the T1 database server computer, a globally unique identification for assignment to the new summary T2 database tag.

16. The method of claim 14 further comprising the step of: generating, by the T1 database server computer after the configuring step, a summary T2 database tag value prior to establishing a corresponding T2 replication tag on the T2 database server computer.

17. A non-transitory computer-readable medium including computer-executable instructions for replicating data in a multi-tiered replicated process database including a tier one (T1) database server computer and a tier two (T2) database server computer, and a network including a communication link between the T1 database server computer and the T2 database server computer, the computer-executable instructions facilitating performing the steps of:

maintaining, by the T1 database server computer, a process history database;

executing, by the T1 database server computer, a replication service comprising a set of accumulators, each accumulator being adapted to render a summary T2 database tag data structure from a set of data values retrieved from the process history database for a specified T1 database tag; wherein the T1 database server computer further comprises a synchronization request storage, the synchronization request storage being adapted to store a set of events corresponding to replicating out-of-order data to the T2 database, and the replication service being adapted to process a synchronization request retrieved from the synchronization request storage to render an updated replicated value for storage on the T2 database server computer; wherein a delay in receiving data from a source is used to dynamically adjust a sourcelateness for the accumulator, said sourcelateness representing a predicted delay period between a timestamp on the received data and when the data is actually received by the replication service, said adjustment increased or decreased if said delay exceeds or is lower than the sourcelateness value; and wherein the sourcelateness is lowered using a time-based filter that causes a gradual reduction of the sourcelateness to a series of values having a lower lateness value than said sourcelateness; and maintaining, by the T2 database server computer, a consolidated database including process data replicated from a set of T1 database servers, wherein at least a portion of the process data replicated from the set of T1 database servers is summary T2 database tag data rendered by the set of accumulators.

* * * * *